(12) United States Patent
Kwon

(10) Patent No.: US 11,214,307 B2
(45) Date of Patent: Jan. 4, 2022

(54) POWER TRANSMISSION DEVICE OF STEERING APPARATUS

(71) Applicant: MANDO CORPORATION, Gyeonggi-do (KR)

(72) Inventor: HyunBi Kwon, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 224 days.

(21) Appl. No.: 16/543,388

(22) Filed: Aug. 16, 2019

(65) Prior Publication Data

US 2020/0062305 A1 Feb. 27, 2020

(30) Foreign Application Priority Data

Aug. 23, 2018 (KR) .......................... 10-2018-0098747

(51) Int. Cl.
*B62D 7/22* (2006.01)
*B62D 7/20* (2006.01)
*B62D 5/04* (2006.01)

(52) U.S. Cl.
CPC ........... *B62D 7/226* (2013.01); *B62D 5/0463* (2013.01); *B62D 7/20* (2013.01)

(58) Field of Classification Search
CPC ........ B62D 7/226; B62D 5/0463; B62D 7/20; B62D 5/046
See application file for complete search history.

(56) References Cited

U.S. PATENT DOCUMENTS 5,690,361 A * 11/1997 Mouri ..................... F16F 15/08
280/771
6,460,650 B2 * 10/2002 Tsuboi ................. B62D 5/0409
180/444
6,851,508 B2 * 2/2005 Fukuda ................ B62D 5/0427
180/443
7,219,761 B2 * 5/2007 Fukuda ................ B62D 5/0427
180/443
8,505,675 B2 * 8/2013 Suzuki ....................... F16D 3/68
180/444
9,897,148 B2 * 2/2018 Hong ................... B62D 5/0409
10,054,190 B2 * 8/2018 Kim ......................... F16D 3/12
10,300,780 B2 * 5/2019 Yokouchi ................ F16C 3/023
10,556,616 B2 * 2/2020 Yun ....................... B62D 5/0403

(Continued)

FOREIGN PATENT DOCUMENTS

JP 2007-120592 5/2007

OTHER PUBLICATIONS

Extended European Search Report dated Jan. 23, 2020 for European Patent Application No. 19192092.5.

*Primary Examiner* — Jacob D Knutson
*Assistant Examiner* — Michael R Stabley
(74) *Attorney, Agent, or Firm* — Ladas & Parry, LLP

(57) ABSTRACT

Each of embodiments provides a power transmission device of a steering apparatus including: a first shaft that has an one-side end at which a coupling end of which a diameter is reduced and formed is provided; a second shaft that has an end facing the first shaft at which a coupling groove into which the one-side end of the first shaft is inserted is provided; and an elastic support member having an inner circumferential face into which the coupling end is inserted and an outer circumferential face that is supported on and coupled with an inner circumferential face of the coupling groove.

19 Claims, 9 Drawing Sheets

(56) References Cited

U.S. PATENT DOCUMENTS

2008/0128195 A1* 6/2008 Kubota ................... F16D 3/68
  180/444
2017/0058991 A1   3/2017 Kim et al.
2018/0209861 A1* 7/2018 Nishiguchi .......... B62D 5/0463

* cited by examiner

POWER TRANSMISSION DEVICE OF STEERING APPARATUS

CROSS-REFERENCE TO RELATED APPLICATION

This application claims priority from Korean Patent Application No. 10-2018-0098747, filed on Aug. 23, 2018, which is hereby incorporated by reference for all purposes as if fully set forth herein.

BACKGROUND OF THE INVENTION

Field of the Invention

Embodiments relate to a power transmission device of a steering apparatus and, more particularly, to a power transmission device of a steering apparatus capable of more firmly maintaining rigidity without any vibration or noise more than a conventional power transmission device while transferring a rotating force from a first shaft to a second shaft and performing absorption of noise, prevention of deformation, and prevention of reduction in durability according to heat and shocks.

Description of Related Art

A steering apparatus of a vehicle is an apparatus enabling a driver to freely changing the advancement direction of the vehicle by turning a steering handle and is an apparatus assisting a driver such that the driver can cause the vehicle to advance in a desired direction by arbitrarily changing the rotation center around which front wheels of the vehicle swivel. In order to alleviate a driver's force in such a steering apparatus, a motor-driven power assisted steering apparatus is used as an auxiliary power mechanism.

The motor-driven power assisted steering apparatus has a structure for smoothly operating a steering apparatus by operating a motor that detects rotation of a steering wheel, is mounted to a rack or a steering shaft, and assists rotational moving.

However, a power transmission device of such a conventional motor-driven power-assisted steering apparatus has a structure in which an inner rotor and an outer rotor are coupled by being fitted in a simply pressing manner, and inner sides of the inner rotor and the outer rotator are directly brought into contact with each other, and the wearing advances to some degree, and a high-level shock is reversely input along a steering shaft at the time of running on a road such as an off-road, whereby there is a problem in that abrasion of parts and noise according to contact occur.

In addition, a process of assembling the inner rotor and the outer rotor and a process of coating a space therebetween with grease are necessary, and accordingly, there are problems in that the number of assembly processes increases, and the production cost becomes high.

SUMMARY OF THE INVENTION

Thus, these embodiments are proposed from the backgrounds described above, and an object thereof is for being capable of more firmly maintaining the rigidity without any vibrations and noise while transmitting a rotational force from a first shaft to a second shaft than a conventional power transmission device and being capable of performing absorption of noise, prevention of deformation, and reduction of durability due to heat and shocks.

The object of these embodiments is not limited thereto, and other objects not described here can be clearly understood by a person skilled in the art from the following description.

In order to achieve such an object, these embodiments provide a power transmission device of a steering apparatus including: a first shaft that has an one-side end at which a coupling end is provided; a second shaft that has an end facing the first shaft at which a coupling groove into which the one-side end of the first shaft is inserted is provided; and an elastic support member having an inner circumferential face with which the coupling end is supported and coupled and an outer circumferential face that is supported on and coupled with an inner circumferential face of the coupling groove.

According to these embodiments as described above, there are effects of being capable of more firmly maintaining the rigidity without any vibrations and noise while transmitting a rotational force from the first shaft to the second shaft than a conventional power transmission device and being capable of performing absorption of noise, prevention of deformation, and reduction of durability due to heat and shocks.

DETAILED DESCRIPTION OF THE INVENTION

Figure 1:
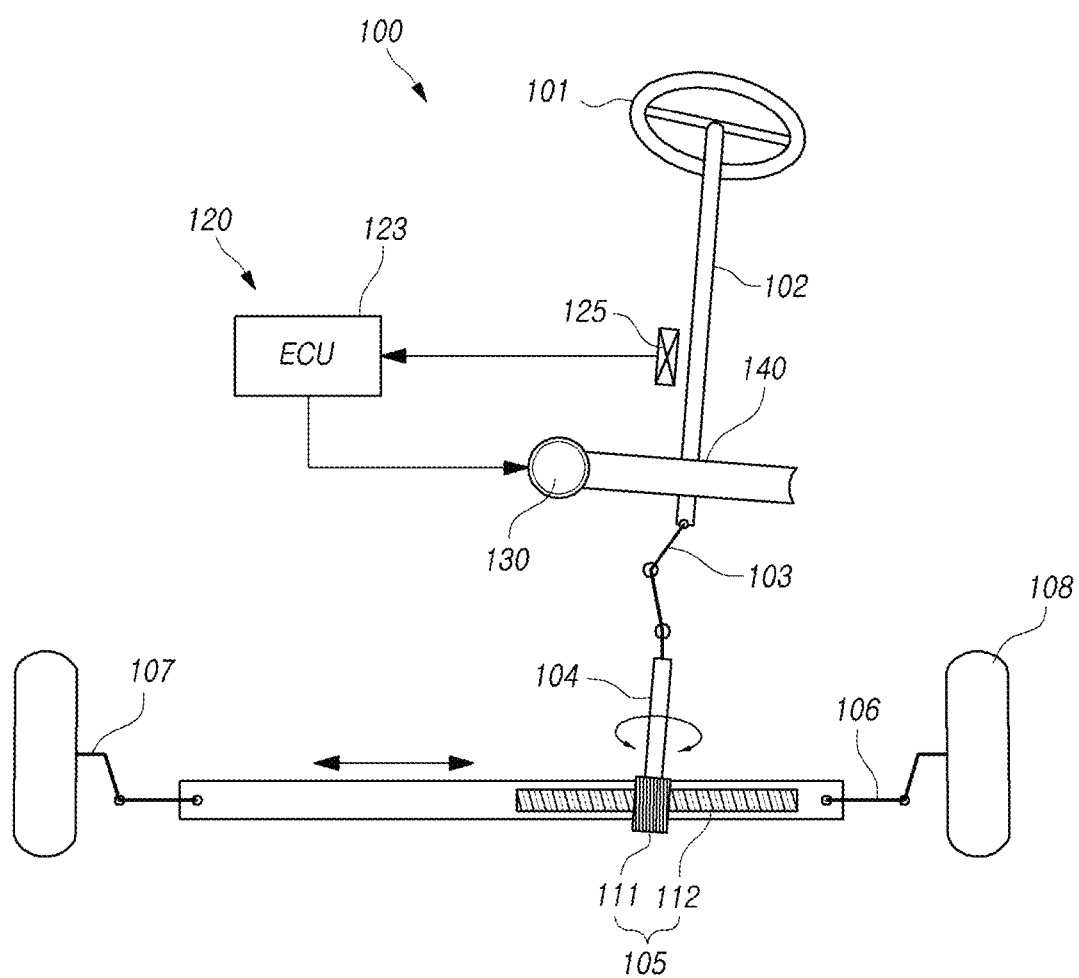
FIG. 1 is a schematic view schematically illustrating a steering apparatus according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Figure 2:
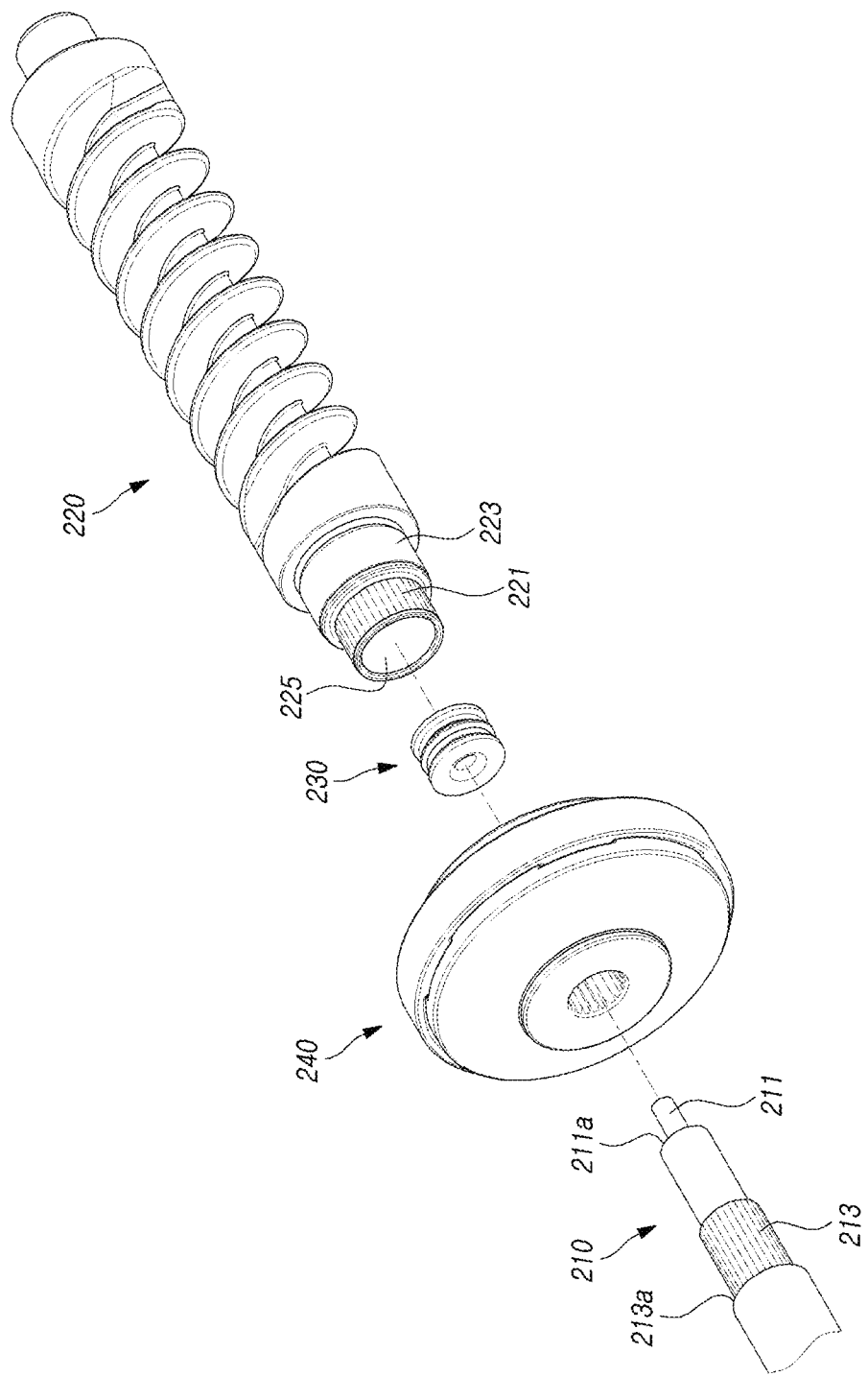
FIGS. 2 and 3 are perspective views illustrating a power transmission device of a steering apparatus according to the embodiments.
Figure 3:
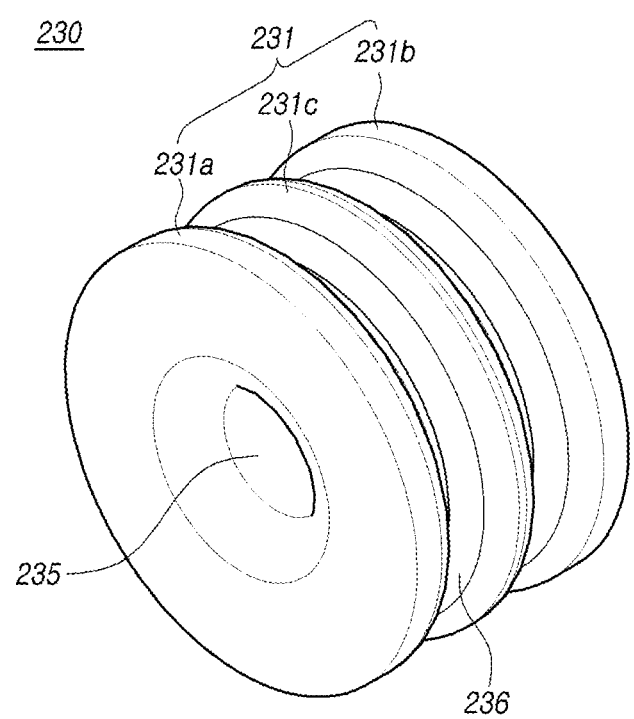
Figure 4:
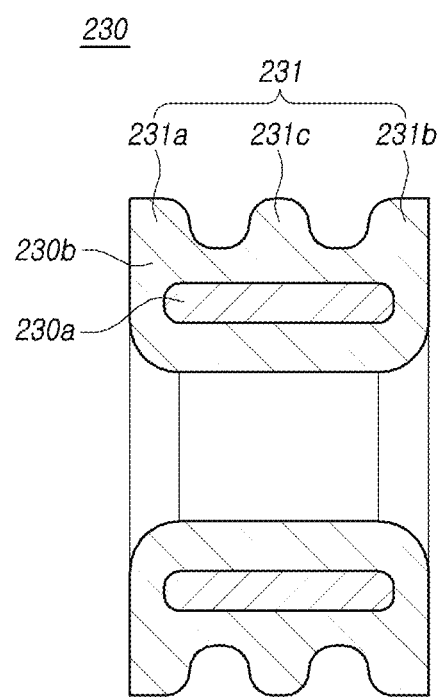
FIGS. 4 and 5 are cross-sectional views illustrating a power transmission device of a steering apparatus according to the embodiments.
Figure 5:
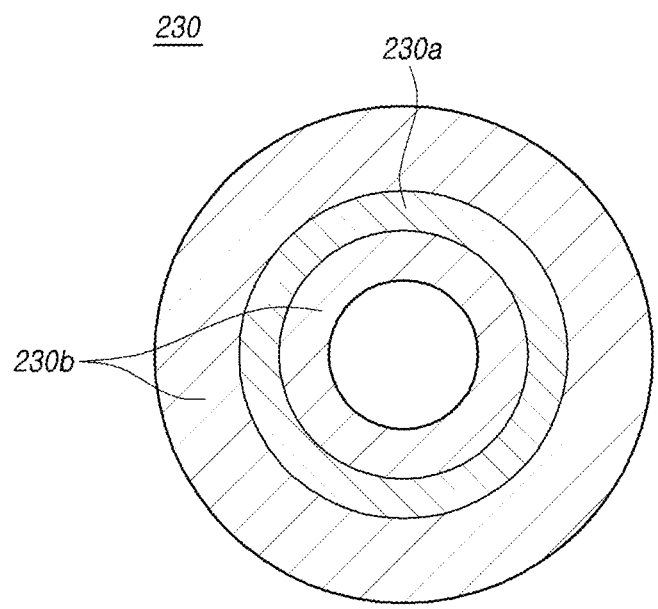
Figure 6:
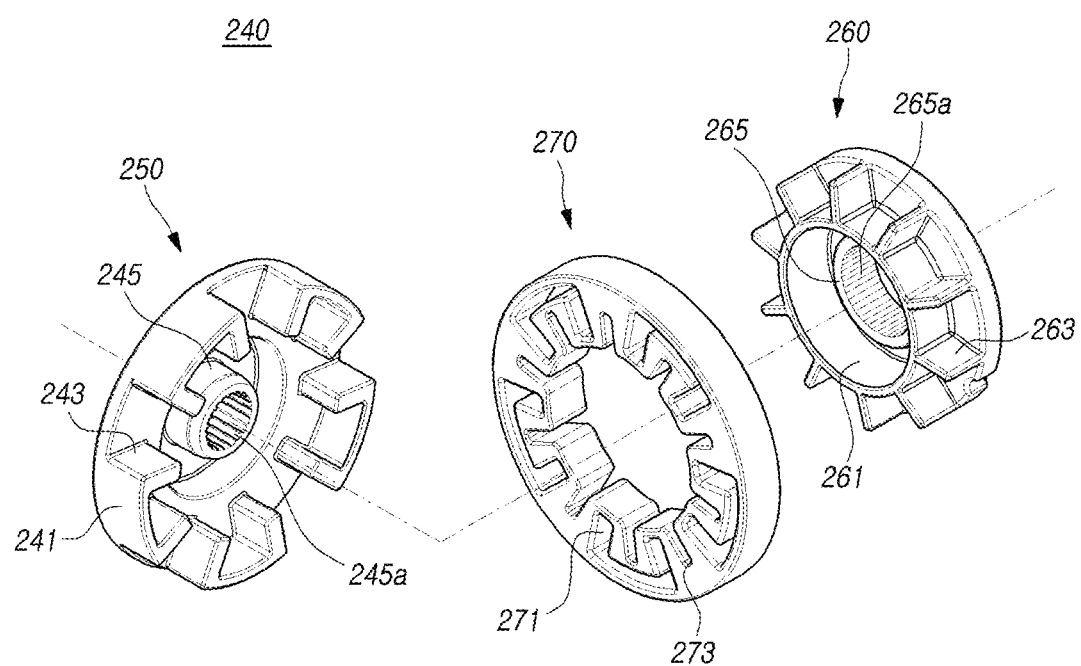
FIG. 6 is a perspective view illustrating a power transmission device of a steering apparatus according to the embodiments.
Figure 7:
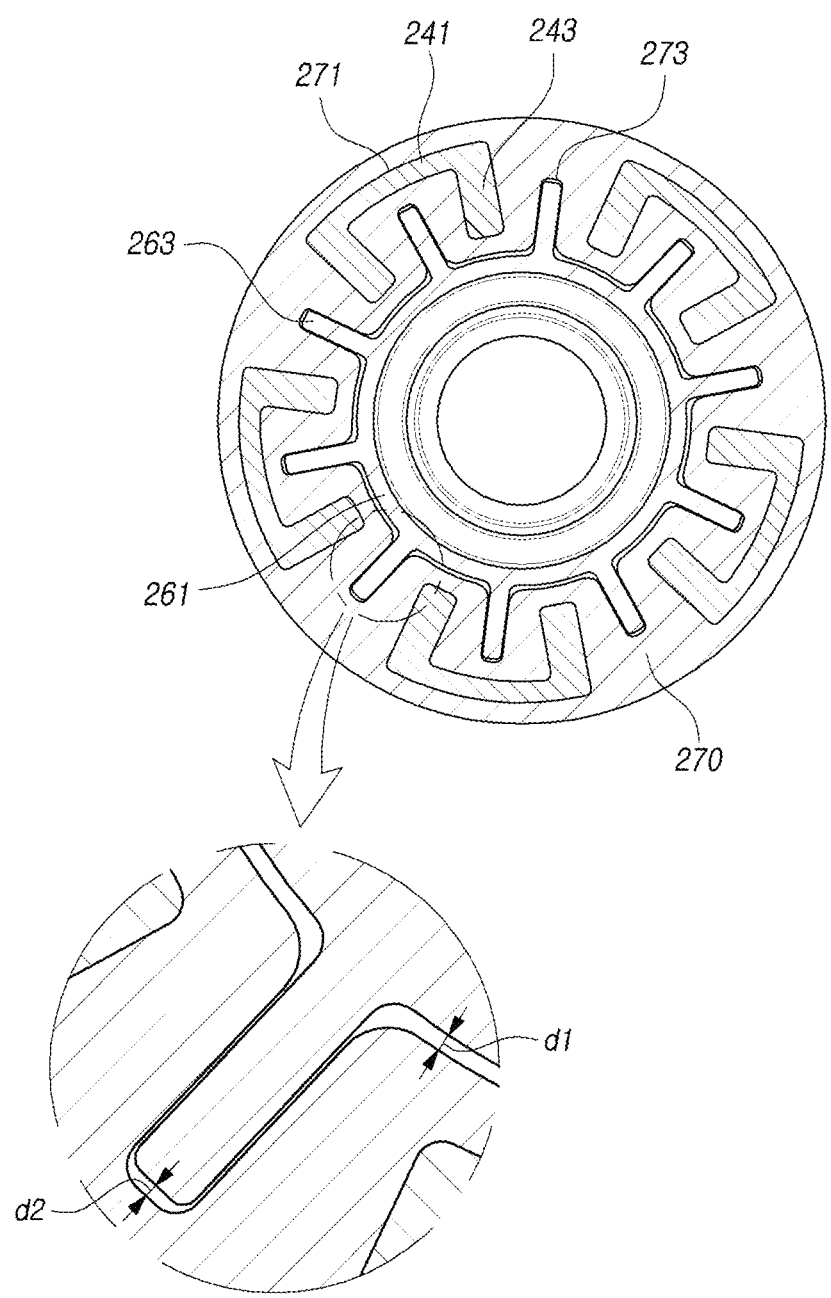
FIGS. 7 to 9 are cross-sectional views illustrating a power transmission device of a steering apparatus according to the embodiments.
Figure 8:
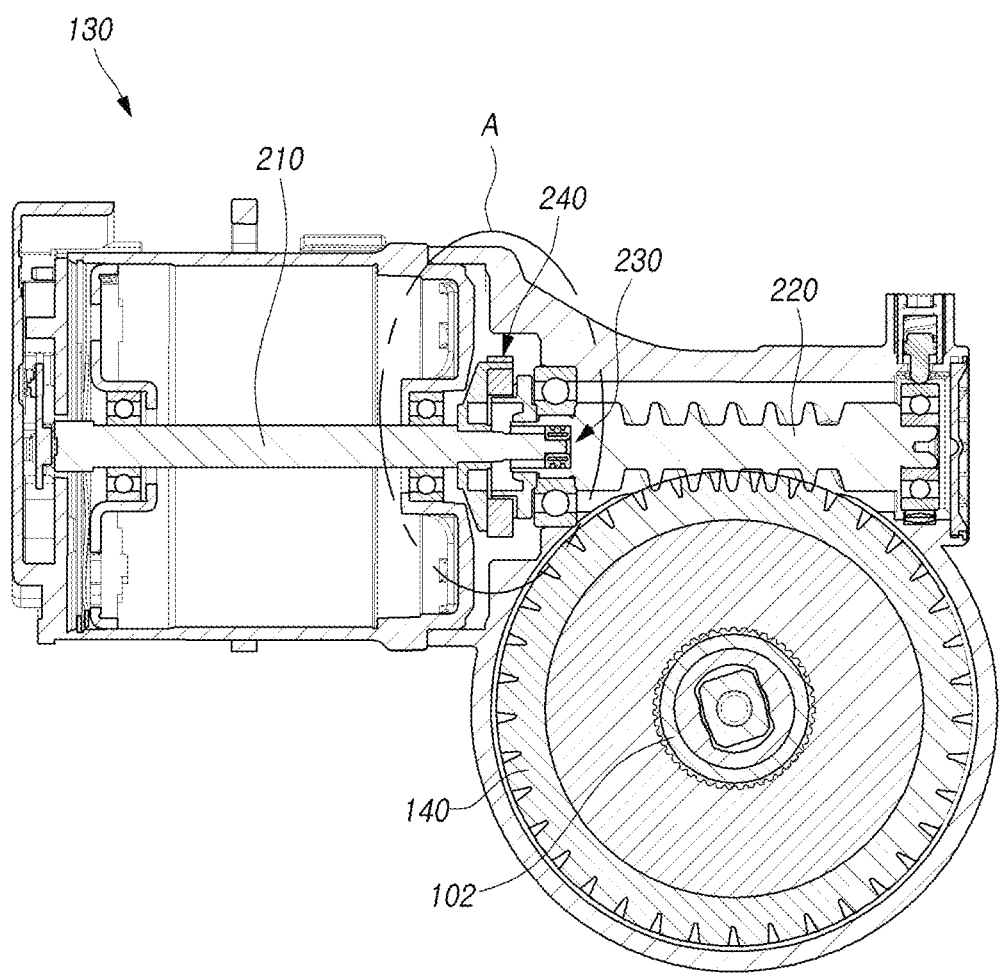
Figure 9:
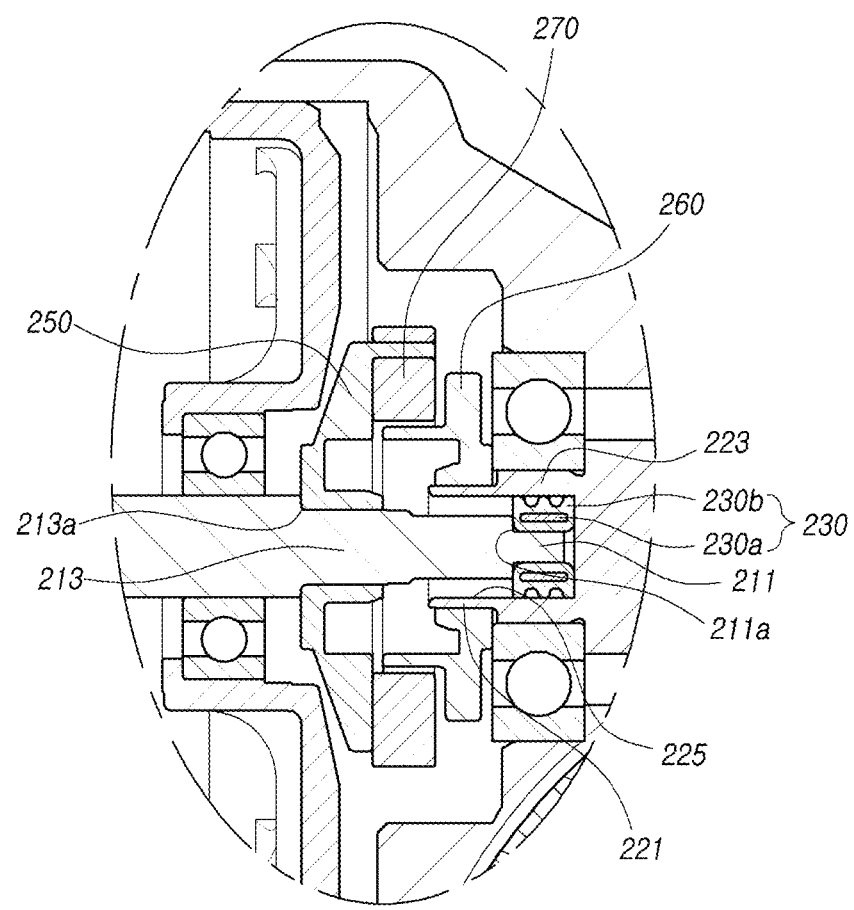

FIG. 1 is a schematic view schematically illustrating a steering apparatus according to embodiments, FIGS. 2 and 3 are perspective views illustrating a power transmission device of a steering apparatus according to the embodiments, FIGS. 4 and 5 are cross-sectional views illustrating a power transmission device of a steering apparatus according to the embodiments, FIG. 6 is a perspective view illustrating a power transmission device of a steering apparatus according to the embodiments, and FIGS. 7 to 9 are cross-sectional views illustrating a power transmission device of a steering apparatus according to the embodiments.

As illustrated in these drawings, the power transmission device of the steering apparatus according to the embodiments includes a first shaft 210 having one-side end at which a coupling end 211 is provided, a second shaft 220 having an end facing the first shaft 210, into which one-side end of the first shaft 210 is inserted, at which a coupling groove 225 is provided, and an elastic support member 230 in which the coupling end 211 is supported at and coupled with an inner circumferential face, and an outer circumferential face is supported at and coupled with the inner circumferential face of the coupling groove 225.

The power transmission device is coaxially connected to the first shaft 210 connected to a power source such as a motor or a pump and transmits a rotation force from the power source to the second shaft 220, and, in detailed description of the embodiments, a motor-driven power assisted steering apparatus formed by a motor shaft as the first shaft 210 and a worm shaft as the second shaft 220 will be described as one example.

It will be described that the elastic support member 230 connects the first shaft 210 and the second shaft 220, a first connecting member 250 is coupled with the first shaft 210, and the second connecting member 260 is coupled with the second shaft 220 as one example.

For reference, in this case, the power transmission device connects the motor shaft generating auxiliary power of the motor-driven power-assisted steering apparatus and the worm shaft, transmits auxiliary power generated by the motor to a steering shaft coupled with a worm wheel, and thus is used as a power connecting device assisting the steering force of a driver.

Here, if briefly described, the motor-driven power auxiliary steering apparatus, as illustrated in FIG. 1, includes a steering system 100 configured from a steering wheel 101 to both-side wheels 108 and an auxiliary power mechanism 120 providing steering auxiliary power for the steering system 100.

The steering system 100 includes a steering shaft 102 having one end that is connected to the steering wheel 101 and rotates together with the steering wheel 101 and the other side that is connected to a pinion shaft 104 though one pair of universal joints 103.

In addition, the pinion shaft 104 is connected to a rack bar through a rack-pinion mechanism 105, and both ends of the rack bar are connected to wheels 108 of the vehicle through a tie rod 106 and a knuckle arm 107. Since the rack-pinion mechanism 105 is formed by engaging a pinion gear 111 formed in the pinion shaft 104 and a rack gear 112 formed on one side of the outer circumferential face of the rack bar with each other, if a driver operates the steering wheel 101, torque is generated by the steering system 100, and the wheels 108 are steered through the rack-pinion mechanism 105 and tie rod 106 in accordance with the torque.

The auxiliary power mechanism 120 includes a torque sensor 125 that detects torque applied to the steering wheel 101 by a driver and outputs an electric signal that is in proportion to the detected torque, an electronic control unit 123 that generates a control signal based on the electric signal transmitted from the torque sensor, a motor 130 that generates auxiliary power based on the signal transmitted from the electronic control unit, and a reducer 140 that delivers the auxiliary power generated by the motor to the steering shaft 102.

Here, as illustrated in FIGS. 2 to 10, the power transmission device includes an elastic support member 230 and a connecting member 240 for coaxially connecting the first shaft 210 and the second shaft 220 and transmitting power, and the connecting member 240 includes a first connecting member 250, a second connecting member 260, and a damping member 270.

A coupling end 211 of which a diameter is formed to be reduced is provided at one-side end of the first shaft 210, and a coupling groove 225 into which the one-side end of the first shaft 210 is inserted is provided at an end of the second shaft 220 that faces the first shaft 210.

The coupling end 211 of the first shaft 210 is supported on and coupled with an inner circumferential face of a through hole 235 of the elastic support member 230 that is formed in an approximately cylindrical shape, and an outer circumferential face of the elastic support member 230 is supported on and coupled with an inner circumferential face of the coupling groove 225 of the second shaft 220.

One side face of the elastic support member 230 in an axial direction is supported on a stepped part 211a formed at a tip end of the coupling end 211 of the first shaft 210, and the other side face of the elastic support member 230 in the axial direction is supported on an inner wall face of the coupling groove 225 of the second shaft 220 and is elastically supported in the axial direction and a radial direction.

At least one protrusion 231 is formed on an outer circumferential face 236 of the elastic support member 230, the protrusion 231 is formed in a ring shape, and two or more protrusions may be formed with being separate away from each other in the axial direction. One example in which three protrusions 231a, 231b, and 231c are formed with being separate away in the axial direction is illustrated in FIGS. 3 and 4.

In addition, the protrusions 231 may be formed to be connected in a circumferential direction or a spiral direction.

The elastic support member 230 includes an inner member 230a and an outer member 230b. The inner member 230a is formed in a ring shape using a metal material or a plastic material, is provided on the inner side of the elastic support member 230, and has a function of maintaining rigidity of the elastic support member 230.

The outer member 230b formed to enclose the outer side of the inner member 230a is formed using an elastic material and has a function of elastically supporting in an axial direction and a radial direction.

Such an outer member 230b is formed using an elastic material such as natural rubber (NR), nitrile butadiene rubber (NBR), Chloroprene rubber (CR), ethylene propylene terpolymer (EPDM), fluoro rubber (FPM), styrene butadiene rubber (SBR), chlorosulphonated polyethylene (CSM), urethane, or silicon so as to have weatherproof, flexibility, and the like together with an elastic force and has the role of damping for absorbing noise and vibrations.

The connecting member 240 that has one end with which the first shaft 210 is coupled and the other side with which the second shaft 220 is coupled, coaxially connects the first shaft 210 and the second shaft 220, and transmits power is provided. Here, the connecting member 240 includes a first connecting member 250, a second connecting member 260, and a damping member 270.

In other words, the first connecting member 250 is coupled with an outer circumferential face of the first shaft 210 located at a position separate away from the coupling end 211, the second connecting member 260 is coupled with an outer circumferential face of an end of the second shaft 220 that faces the first shaft 210, and a damping member 270 is coupled between the first connecting member 250 and the second connecting member 260.

Here, the first connecting member 250 and the second connecting member 260 may be formed using a metal material such as steel or an engineering plastic-based material such as polyacetal (POM), polyamide (PA), polycarbonate (PC), polyimide (PI), or polybutylene terephthalate (PBT).

A first shaft connecting part 245 having a cylindrical shape protruding in the axial direction is provided at the center of the first connecting member 250, and a first coupling hole 245a into which the first shaft 210 is inserted is formed in the first shaft connecting part 245.

A serration in the axial direction or a direction inclined with respect to the axial direction is formed on the inner circumferential face of the first coupling hole 245a and is coupled with the first shaft 210 in which a serration 213 corresponding thereto is formed, whereby idle rotation of the first shaft 210 can be prevented.

In other words, a serration 213 and a supporting stepped part 213a are formed on the outer circumferential face located at a position separate away from the coupling end 211 of the first shaft 210 and is engaged and coupled with the serration of the first coupling hole 245a, and the one-side end of the first connecting member 250 is supported on and coupled with the supporting stepped part 213a of the first shaft 210.

A first support part 241 having a circular arc or arc shape protruding from the outer circumferential face in the axial direction is provided in the first connecting member 250, and a first coupling part 243 extending in the radial direction may be provided in the first support part 241.

A plurality of first support parts 241 separated away from each other in a circumferential direction may be provided. The first coupling parts 243 may be provided at both ends of the first support part 241 in the circumferential direction, and the first support parts 241 and the first coupling part 243 are configured to be inserted into the damping member 270 to be described later.

A second shaft connecting part 265 having a cylindrical shape protruding in the axial direction is provided at the center of the second connecting member 260, and a second coupling hole 265a into which the second shaft 220 is inserted is formed in the second shaft connecting part 265.

A serration in the axial direction is formed on the inner circumferential face of the second coupling hole 265a and is coupled with the second shaft 220 in which a serration 221 corresponding thereto is formed, whereby idle rotation of the second shaft 220 is prevented.

In other words, a serration 221 corresponding to the serration of the second coupling hole 265a and a bearing seating surface 223 are formed to have a level difference on an outer circumferential face of the end of the second shaft 220 that corresponds to a position at which the coupling groove 225 is formed, and the second connecting member 260 and a bearing are coupled with an end of the second shaft 220.

A second support part 261 protruding in the axial direction is provided in the second connecting member 260, and a second coupling part 263 extending in the radial direction may be provided on the outer circumferential face of the second support part 261.

The second support part 261 is formed in a cylindrical shape, and a plurality of second coupling parts 263 are separated in the circumferential direction on the outer circumferential face of the second support part 261 and are formed to be arranged in a radial pattern.

The second coupling parts 263 are arranged between the first coupling parts 243 in the circumferential direction, and, as illustrated in FIG. 7, the first coupling part 243 and the second coupling part 263 are alternately arranged in the circumferential direction, and outer ends of the second coupling parts 263 in the radial direction are formed to be separated away from the inner sides of the first support parts 241 in the radial direction.

In other words, the first coupling part 243 and the second coupling part 263 are alternately arranged in the circumferential direction if seen in the axial direction, and the second coupling parts 263 are arranged on an inner side of the first support parts 241 in the radial direction, whereby a support force in the circumferential direction when the first shaft 210 and the second shaft 220 rotate can be uniformly distributed.

On the other hand, the damping member 270, as illustrated in FIGS. 6 and 7, is formed in a ring shape, includes a first insertion part 271 in which the first support parts 241 and the first coupling parts 243 are coupled between an inner circumferential face and an outer circumferential face, is coupled with the first shaft 210, and transmits power while absorbing a load and a vibration in the axial direction and the radial direction.

While the second support part 261 is coupled with the inner circumferential face of the damping member 270, a gap d1 is provided between the inner circumferential face of the damping member 270 and the outer circumferential face of the second support part 261, and thermal expansion of the damping member 270 can be absorbed.

In addition, while a second insertion part 273 with which the second coupling parts 263 are coupled is provided on the inner circumferential face of the damping member 270, a gap d2 is provided between a tip end of the second coupling part 263 and the inner circumferential face of the second insertion part 273.

Accordingly, thermal expansion of the damping member 270 at a high temperature occurs only at the center in the radial direction and can be absorbed in the gaps d1 and d2, and the rigidity of the damping member 270 can be firmly maintained without any vibration and noise while transmitting a rotational force from the first shaft 210 to the second shaft 220, and noise caused by heat and shocks is absorbed.

In other words, the first support parts 241 and the first coupling parts 243 are adhered to the first insertion part 271 to be coupled therewith, and gaps d1 and d2 between the inner circumferential face of the damping member 270 and the outer circumferential face of the second support part 261 and the tip end of the second coupling part 263 and the inner circumferential face of the second insertion part 273 are provided. Accordingly, a twisting load occurring in the damping member 270 is reduced, and deformation of insertion portions of the second coupling parts 263 and reduction in durability due to expansion of the damping member 270 at a high temperature can be prevented.

According to the embodiments having the structure and the shape described above, there are effects of being capable of more firmly maintaining the rigidity without any vibrations and noise while transmitting a rotational force from the first shaft to the second shaft than a conventional power transmission device and being capable of performing absorption of noise, prevention of deformation, and reduction of durability due to heat and shocks.

Although all the constituent elements configuring these embodiments have been described as being coupled as one or operating in combination, these embodiments are not necessarily limited to such embodiments. In other words, constituent elements may operate by selectively combining one or more of all the constituents within the objects of these embodiments.

In addition, a term such as "include", "configure", "have", or the like described above means that a corresponding constituent element may be included unless otherwise mentioned, and accordingly, it should be interpreted such that other constituent elements are not excluded, and other constituent elements may be further included. All the terms including technical and scientific terms, unless otherwise defined, have the same meanings as those that are generally understood by a person skilled in the art to which these embodiments belong. Terms such as terms defined in dictionaries that are generally used should be interpreted to coincide with meanings in the context of related arts and, unless clearly defined in these embodiments, should not be interpreted as having an ideal or excessively formal meaning.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

210 First shaft
220 Second shaft
230 Elastic support member
230a Inner member
230b Outer member
231 Protrusion
240 Connecting member
250 First connecting member
260 Second connecting member
270 Damping member

What is claimed is:

1. A power transmission device of a steering apparatus comprising:
   a first shaft that has a one-side end at which a coupling end is provided;
   a second shaft that has an end facing the first shaft at which a coupling groove into which the one-side end of the first shaft is inserted is provided;
   an elastic support member having an inner circumferential face with which the coupling end is supported and coupled and an outer circumferential face that is supported on and coupled with an inner circumferential face of the coupling groove; and
   a connecting member that has one side with which the first shaft is coupled and the other side with which the second shaft is coupled and transmits power by coaxially connecting the first shaft and the second shaft.

2. The power transmission device of a steering apparatus according to claim 1, wherein one side face of the elastic support member in an axial direction is supported on a stepped part formed at a tip end of the coupling end, and the other side face of the elastic support member in the axial direction is supported on an inner wall face of the coupling groove.

3. The power transmission device of a steering apparatus according to claim 2, wherein at least one protrusion is formed on an outer circumferential face of the elastic support member.

4. The power transmission device of a steering apparatus according to claim 3, wherein two or more protrusions are formed in a ring shape and are formed to be separated away from each other in the axial direction.

5. The power transmission device of a steering apparatus according to claim 2, wherein the protrusion is formed in the outer circumferential face of the elastic support member, and the protrusion is formed to be connected in a circumferential direction or a spiral direction.

6. The power transmission device of a steering apparatus according to claim 1, wherein the connecting member includes:
   a first connecting member that is coupled with an outer circumferential face located at a position separate away from the coupling end of the first shaft;
   a second connecting member that is coupled with an outer circumferential face of an end of the second shaft that faces the first shaft; and
   a damping member that is coupled between the first connecting member and the second connecting member.

7. The power transmission device of a steering apparatus according to claim 6, wherein a supporting stepped part of which a diameter is enlarged is formed on the outer circumferential face located at a position separate away from the coupling end of the first shaft and has one side end of the first connecting member supported and coupled therewith.

8. The power transmission device of a steering apparatus according to claim 7, wherein the first connecting member includes a first-shaft connection part protruding in the axial direction at the center, and a first coupling hole into which the first shaft is inserted is formed in the first shaft connection part.

9. The power transmission device of a steering apparatus according to claim 8, wherein the first connecting member includes a first support part protruding in the axial direction on the outer circumferential face, and a first coupling part extending in a radial direction is provided in the first support part.

10. The power transmission device of a steering apparatus according to claim 9, wherein a plurality of first support parts are provided with being separate in a circumferential direction, and first coupling parts are provided at both ends of the first support parts in the circumferential direction.

11. The power transmission device of a steering apparatus according to claim 10, wherein a second-shaft connection part protruding in the axial direction is provided at the center of the second connecting member, and a second coupling hole into which the second shaft is inserted is formed in the second-shaft connection part.

12. The power transmission device of a steering apparatus according to claim 11, wherein the second connecting member includes a second support part protruding in the axial direction, and a second coupling part extending in the radial direction is provided on the outer circumferential face of the second support part.

13. The power transmission device of a steering apparatus according to claim 12, wherein the second support part is formed in a cylindrical shape, and a plurality of second coupling parts are separate away in the circumferential direction and are arranged in a radial pattern.

14. The power transmission device of a steering apparatus according to claim 13, wherein the second coupling parts are arranged between the first coupling parts in the circumferential direction.

15. The power transmission device of a steering apparatus according to claim 14, wherein tip ends of the second coupling parts are formed to be separate from inner sides of the first support parts in the radial direction.

16. The power transmission device of a steering apparatus according to claim 15, wherein the damping member includes a first insertion part formed in a ring shape in which the first support parts and the first coupling parts are coupled between an inner circumferential face and an outer circumferential face.

17. The power transmission device of a steering apparatus according to claim 16, wherein a gap is provided between the inner circumferential face of the damping member and outer circumferential faces of the second support parts.

18. The power transmission device of a steering apparatus according to claim 17, wherein a second insertion part with which the second coupling parts are coupled is provided on the inner circumferential face of the damping member, and a gap is provided between tip ends of the second coupling parts and an inner circumferential face of the second insertion part.

19. A power transmission device of a steering apparatus comprising:
a first shaft that has a one-side end at which a coupling end is provided;
a second shaft that has an end facing the first shaft at which a coupling groove into which the one-side end of the first shaft is inserted is provided;
an elastic support member having an inner circumferential face with which the coupling end is supported and coupled and an outer circumferential face that is supported on and coupled with an inner circumferential face of the coupling groove,
wherein the elastic support member includes:
an inner member that is formed in a ring shape using a metal material or a plastic material and is provided on an inner side of the elastic support member; and
an outer member that is formed to enclose an outer side of the inner member using an elastic material.

* * * * *